(12) United States Patent
Blosser et al.

(10) Patent No.: US 6,862,253 B2
(45) Date of Patent: Mar. 1, 2005

(54) SONIC IDENTIFICATION SYSTEM AND METHOD

(75) Inventors: Robert L. Blosser, 2579 Harvest La., West Jordan, UT (US) 84084; Ronald E. Madsen, Salt Lake City, UT (US)

(73) Assignee: Robert L. Blosser, West Jordan, UT (US)

(*) Notice: Subject to any disclaimer, the term of this patent is extended or adjusted under 35 U.S.C. 154(b) by 0 days.

(21) Appl. No.: 10/359,926

(22) Filed: Feb. 5, 2003

(65) Prior Publication Data

US 2004/0081020 A1 Apr. 29, 2004

Related U.S. Application Data

(60) Provisional application No. 60/420,654, filed on Oct. 23, 2002.

(51) Int. Cl.[7] .......................... G01S 15/00; G08B 13/00
(52) U.S. Cl. .......................... 367/93; 340/552; 340/566
(58) Field of Search .......................... 367/87, 93, 135, 367/191; 340/552, 566, 429, 426

(56) References Cited

U.S. PATENT DOCUMENTS

| | | | |
|---|---|---|---|
| 3,986,182 A | | 10/1976 | Hackett |
| 4,347,590 A | | 8/1982 | Heger et al. |
| 4,382,291 A | | 5/1983 | Nakauchi |
| 4,499,564 A | | 2/1985 | Sirai |
| 4,625,199 A | | 11/1986 | Pantus |
| 4,628,496 A | | 12/1986 | Lee |
| 4,647,913 A | | 3/1987 | Pantus |
| 4,755,973 A | | 7/1988 | Meier et al. |
| 4,847,817 A | | 7/1989 | Au et al. |
| 4,959,817 A | | 9/1990 | Murphree |
| 5,031,228 A | * | 7/1991 | Lu .............................. 382/227 |
| 5,059,946 A | | 10/1991 | Hollowbush |
| 5,091,780 A | | 2/1992 | Pomerleau |
| 5,097,454 A | | 3/1992 | Schwarz et al. |
| 5,150,099 A | | 9/1992 | Lienau |
| 5,402,521 A | | 3/1995 | Niida et al. |
| 5,422,981 A | | 6/1995 | Niki |
| 5,432,864 A | * | 7/1995 | Lu et al. ...................... 382/118 |
| 5,448,484 A | | 9/1995 | Bullock et al. |
| 5,465,308 A | | 11/1995 | Hutcheson et al. |
| 5,517,429 A | | 5/1996 | Harrison |
| 5,519,669 A | | 5/1996 | Ross et al. |
| 5,598,141 A | | 1/1997 | Grasmann et al. |
| 5,612,928 A | | 3/1997 | Haley et al. |
| 5,680,096 A | | 10/1997 | Grasmann |
| 5,712,830 A | | 1/1998 | Ross et al. |
| 5,729,193 A | | 3/1998 | Grasmann et al. |

(List continued on next page.)

OTHER PUBLICATIONS

Nalini K. Ratha, Andrew Senior and Ruud M. Bolle "Automated Biometrics", IBM Thomas J. Watson Research Center.

*Primary Examiner*—Ian J. Lobo
(74) *Attorney, Agent, or Firm*—Thorpe North & Western, LLP

(57) ABSTRACT

A neural net sonic identification system includes an ultrasonic emitter and receiver configured to detect characteristics of a subject by detecting reflections of the ultrasonic waves. The sonic reflections are processed by a neural network pattern recognition system that learns to recognize a particular subject and distinguish it from other subjects. The emitter/receiver is continuously optimized for phase, wavelength, spectral, and power frequencies, and the received sound "picture" is written-over the previously stored encrypted image data file for a particular individual, so as to continuously update the processor's retained identification information. In one embodiment, the emitter/receiver comprises a solid-state multi-layer tunable array of piezoelectric emitters and receivers that can be selectively "aimed" in different directions without physically moving by independently varying the wavelength and power of the various emitters/receivers.

29 Claims, 3 Drawing Sheets

U.S. PATENT DOCUMENTS

| | | |
|---|---|---|
| 5,747,719 A | 5/1998 | Bottesch |
| 5,781,108 A | 7/1998 | Jacob et al. |
| 5,793,704 A | 8/1998 | Freger |
| 5,867,091 A | 2/1999 | Chard |
| 5,903,883 A | 5/1999 | DeAngelis et al. |
| 5,910,765 A | 6/1999 | Slemon et al. |
| 5,920,521 A | 7/1999 | Kromer et al. |
| 6,028,626 A | 2/2000 | Aviv |
| 6,131,090 A | 10/2000 | Basso, Jr. et al. |
| 6,173,074 B1 | 1/2001 | Russo |
| 6,232,874 B1 | 5/2001 | Murphy |
| 6,271,762 B1 | 8/2001 | Murad et al. |
| 6,292,106 B1 | 9/2001 | Solinsky et al. |
| 6,323,761 B1 | 11/2001 | Son |
| 6,334,121 B1 | 12/2001 | Primeaux et al. |
| 6,415,205 B1 | 7/2002 | Myron et al. |
| 6,421,453 B1 | 7/2002 | Kanevsky et al. |
| 2002/0093418 A1 | 7/2002 | Schmitz et al. |
| 2002/0116189 A1 * | 8/2002 | Yeh et al. .................. 704/248 |

\* cited by examiner

SONIC IDENTIFICATION SYSTEM AND METHOD

This application claims priority from U.S. Provisional Patent Application Ser. No. 60/420,654, filed on Oct. 23, 2002, and entitled SONIC IDENTIFICATION SYSTEM AND METHOD.

BACKGROUND OF THE INVENTION

1. Field of the Invention

The present invention relates generally to identification systems. More particularly, the present invention relates to a system for identifying facial and other features of individuals using an array of sonic emitters and receivers, and a neural network processing system.

2. Related Art

A number of systems and methods have been developed for identification of individuals and detection of activities or characteristics of those individuals. Some of these include biometric sensors, motion detection systems, facial recognition systems, etc. Each of the types of systems heretofore known present various limitations or drawbacks. For example, biometric sensors can be awkward and time-consuming to implement. Biometric sensors ordinarily require active sensing of characteristics of a person's body, such as scanning a fingerprint, or scanning the eyes, before a desired result is allowed by an automatic system, such as the unlocking of a door, allowing access to a bank account, etc. Thus, implementation of a biometric system may require the individual to place a portion of their body within a sensor detection area or against a detection device, or to speak certain words, or take some other direct action.

Motion detection systems are well known, but present certain inherent limitations. They can detect motion, but by themselves cannot identify individuals or even differentiate between humans, animals, or other sources of motion. Additionally, the specific actions of an individual within the range of detection of a motion detector cannot be determined.

Facial recognition systems also have certain limitations at the present time. Such systems presently in development generally rely upon optical recognition of facial features, and the comparison of these features with those of other faces stored in a database. Sometimes this involves optical measurement of presumably constant features, such as the spacing of the eyes, etc. This is a very complicated process, and such systems in their present state of development have a relatively high rate of inaccurate identification. Additionally, because they only consider the surface features of an individual, these systems can be "fooled" by disguises, by the ordinary changes in an individual's appearance over time, or, in extreme cases, by changes in appearance through cosmetic surgery.

It would therefore be desirable to have a system that accurately identifies individuals or other objects, and also identifies characteristics and actions of the individual or object. It would also be desirable to have an identification system that is passive, and does not require an individual to take a particular action to be identified. It would also be desirable to have such a system that can "learn" to recognize individuals despite changes in their appearance, whether these are natural changes over time, or deliberate attempts at disguise.

SUMMARY OF THE INVENTION

The invention advantageously provides an ultra-sonic tunable sensor array that detects facial features of individuals, and a neural network/fast Fourier transform processing system for recognizing and identifying those features. The sensor/receiver portion is continuously optimized for phase, wavelength, spectral, and power frequencies (both received and transmitted) and the received sound "picture" is written-over the previously stored encrypted image for a particular individual so as to continuously update the processor's retained identification information.

In one embodiment, the invention can be described as a neural net sonic identification system, having an ultra-sonic emitter and receiver, configured to detect characteristics of a subject by detecting reflections of the ultrasonic waves. The sonic reflections are processed by a neural network pattern recognition system that learns to recognize the particular subject and distinguish it from other subjects. The emitter/receiver is continuously optimized for phase, wavelength, spectral, and power frequencies, and the received sound "picture" is written-over the previously stored encrypted image for a particular individual, so as to continuously update the processor's retained identification information.

In accordance with a more detailed embodiment thereof, the emitter/receiver system comprises a solid-state multi-layer tunable array of piezoelectric emitters and receivers. The array can be selectively "aimed" in different directions without physically moving by independently varying the wavelength and power of the various emitters/receivers.

In yet another embodiment, the invention can be described as a method of identifying characteristics of a subject, comprising the steps of: a) exposing a first subject to ultra-sonic energy; b) receiving and detecting reflections of the ultra-sonic energy from the first subject; c) producing a spectrogram representing the reflections over a time interval using a microprocessor having a memory containing a plurality of records of spectrographic information, each of the plurality of records being related to a specific subject; d) comparing the spectrogram of the first subject to each of the records of spectrographic information contained in the memory using a pattern recognition algorithm, so as to determine a likelihood of correlation of the first spectrogram to any of the plurality of records; e) identifying the first subject as being the subject related to a record if the likelihood of correlation is above a selected threshold level; and f) storing the spectrogram related to the first subject in memory for future comparison with other spectrograms.

In accordance with a more detailed embodiment thereof, the method may include the steps of: g) repeating steps a–d for a second subject; h) comparing the spectrogram of the second subject to the spectrogram of the first subject using a pattern recognition algorithm, so as to determine a likelihood of correlation of the first spectrogram to the second spectrogram; and i) identifying the second subject as being the first subject if the likelihood of correlation is above a selected threshold level.

Additional features and advantages of the invention will be apparent from the detailed description which follows, taken in conjunction with the accompanying drawings, which together illustrate, by way of example, features of the invention.

DETAILED DESCRIPTION

Figure 1:
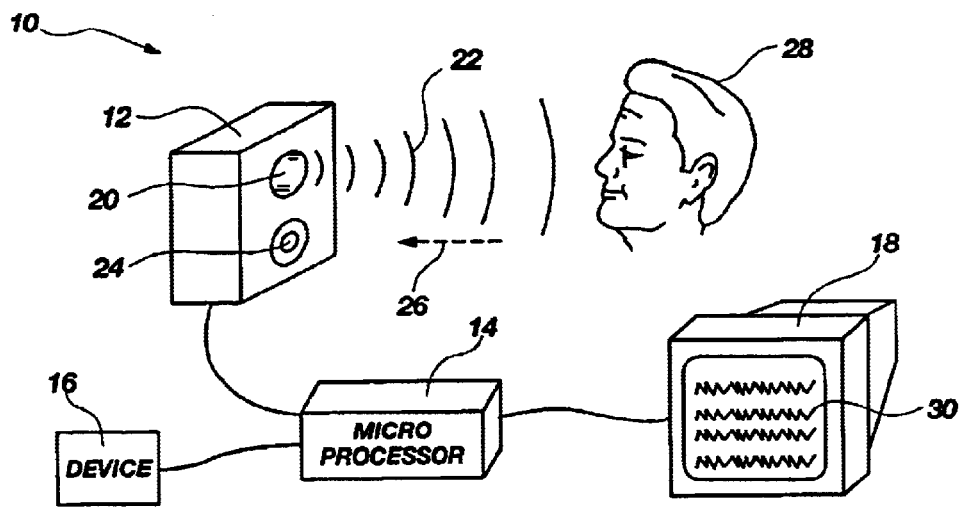
FIG. 1 is a perspective view of one embodiment of a sonic identification system in accordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Ultra-sonic sensors have been used in alarm devices, distance sensors in cameras, and many other applications for many years. Similarly, the use of neural networks, also known as pattern recognition or machine learning, is also known. A neural net system can take a body of electronic data related to a particular thing, and "learn" to recognize subsequent data related to that same thing. The "thing" could be a particular person's voice, the person's appearance, a particular type of motion, etc. A good basic explanation of neural net or machine learning systems is given in a textbook by Tom Mitchell entitled *Machine Learning* (McGraw Hill 1997).

Neural network systems have been used in a variety of applications. Voice recognition systems, for allowing verbal input to computers or verbal control of electronic devices, is a good example of one application of neural net systems. Because each person pronounces words differently, and even a single individual will pronounce the same word in different ways from time to time, a voice recognition system must be "trained" to recognize a particular word as pronounced by a particular individual. This is usually done by obtaining a large amount of sample data called a training set. With voice recognition, the voice of an individual is digitally recorded while speaking certain words. This is preferably repeated several times with the same words to create the training set. The software digitally compares each repetition and notes common mathematically invariant features—digital aspects of the sound signal of each repetition that are identifiable as being the same. Then, when enough of these same invariant features are detected in subsequent streams of sound, the system recognizes them as the particular word.

Safety and security devices are another good application for neural net systems. In addition to verbal control of electromechanical devices, voice recognition systems employing a neural net processing system have been developed as security devices. For example, a voice-recognition neural net system may be connected to a security lock on a door. The system is trained to recognize the voices of certain persons when speaking certain words, and to allow access only to those authorized individuals. Neural net systems have also been used with visual scanners and the like for such things as scanning rooms to detect the presence of individuals (e.g., with or without identification tags), etc. However, such systems as currently developed present a number of limitations.

The present invention advantageously provides a system for identifying characteristics of individuals using ultrasonic energy. In an illustrative example thereof, shown in FIG. 1, the physical features of a sonic identification system 10 include an ultrasonic imaging sensor/receiver 12, a microprocessor 14 for processing signals from the sensor/receiver, and a device 16 for receiving output from the microprocessor. The device may be a door lock, a vehicle ignition switch, a bank vault lock, or any other device that is to be controlled in its use, access, or in other ways. Alternatively or additionally, a device that provides output in humanly cognizable form, such as a computer monitor 18 may also be associated with the system for allowing a person to view data and information related to its operation. This may be desirable for a display viewed by security guards, for example.

The sensor/receiver 12 comprises a sonic emitter 20, configured to emit ultra-sonic waves 22 (i.e., sound waves above the audible range), and a sonic receiver 24. The receiver directly detects the ultrasonic waves that are reflected (the reflections being indicated by line 26) off of a subject 28 that is placed within range of the system. The frequency of the ultrasonic emissions is from about 45 KHZ to about 100 KHZ (well above hearing levels). In one embodiment, the system continuously scans across this frequency range, and also varies power output and other characteristics to obtain echoes with a wide variety of characteristics. The required power output of the emitter is relatively small, and may vary within a general range of from about 0.25 watts to about 2.5 watts. In many applications, power in the range of about 0.25 watts to 1.5 watts is adequate.

The present invention incorporates the fact that the characteristics of reflected sound waves depend upon the density and other characteristics of the substance off of which they reflect. For example, sound of one frequency and power level will reflect off of soft tissue, while sound at another frequency and/or different power level will penetrate the soft tissue and reflect off of bone. Specifically, the present invention analyzes the sonar echoes that return not just surface information about the viewers, but a far richer content (e.g. body weight effects, chest cavity sonar effects, etc.). Additionally, the reflections will vary depending on the position or orientation of a person or object. Thus the sensor array can detect not only the identity of people, but can also detect whether the person is standing, sitting, walking, running, etc.

The microprocessor 14 is configured to receive signals from the receiver and process those signals to produce a sonic "picture" of the sonic reflections. This "picture" is not a visually perceptible image, but is actually just spectral data that indicates the characteristics of the reflected sound waves. If this data were displayed visually on the monitor 18, it would simply present a series of lines 30 representing the characteristics of the reflected sound. Because the sound "picture" is not really a picture, it cannot be reconstructed by the system to provide a visually perceptible image of a person or anything else. This feature of the system should help to allay privacy concerns.

The embodiment of FIG. 1 includes a single ultrasonic emitter 20, such as a low inertia, fast response piezoelectric speaker (e.g. item no. 2HS71 by Motorolla). The receiver 24 may be nothing more than a microphone capable of detecting ultrasonic sound in the desired frequency range. One commercially available device that incorporates such a microphone is known as a bat detector. A bat detector is, as the name implies, a device for detecting the ultrasonic emissions of bats. It is well known that bats produce ultrasonic emissions and listen for reflections in order to "see" in the dark. The bat detector device detects these sounds and electronically converts them into electrical signals that can be amplified to be humanly audible. For purposes of this invention, a similar system can be used for detecting reflections of ultrasonic emissions, and converting them into signals that can be analyzed electronically.

Figure 2:
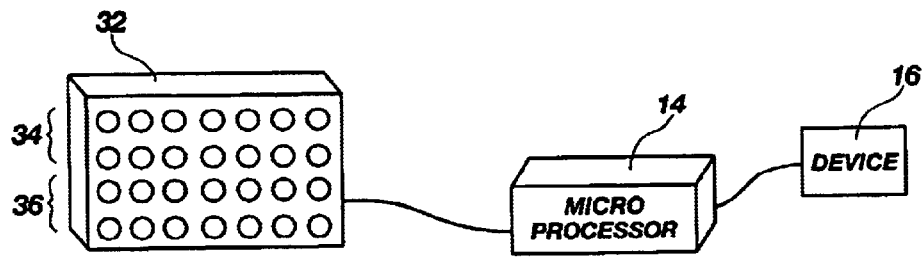
FIG. 2 is a plan view of a sonic identification system having an alternative solid-state sonic emitter/receiver array.

Alternatively, referring to FIG. 2, a solid-state steerable sensor array 32 may be used. This sensor array is made up of a plurality of multi-layer ultra-sonic emitters 34 and receivers 36, which can be individually turned on and off, assigned spectral and power frequencies in emission or reception of a sound spectrogram, or change wavelength and focusing orientation. The multi-layer configuration is created by depositing the emitters and receivers on a support structure comprising a back plate and a front plate. The directional orientation of the sensor array may be varied by independently controlling the phase and/or wavelength of the back plate and front plate emitters and receivers, respectively. By independently adjusting the phase and/or wavelength of individual emitters that generate the sonic wavefront, the system can effectively "point" or "steer" in different directions without physically moving. Advantageously, the array of emitters and sensors provides both high and low frequencies in combination, allowing the system to detect and evaluate both surface features and subsurface features.

Figure 3:
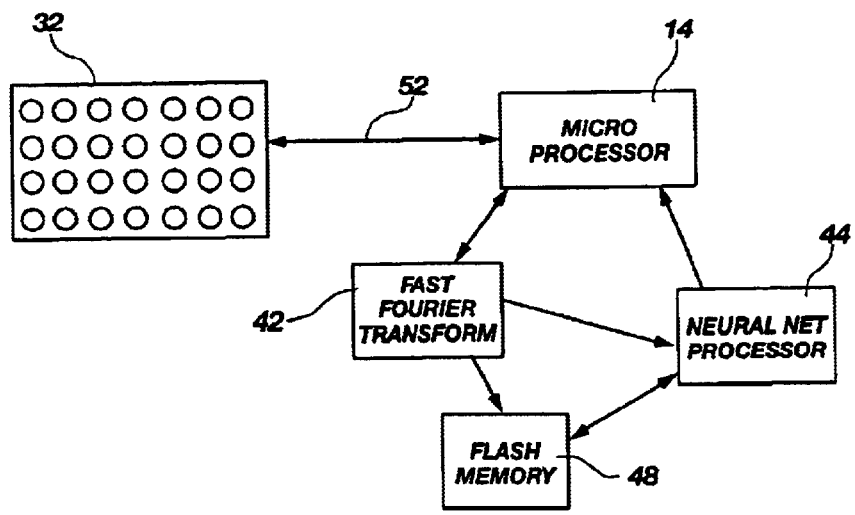
FIG. 3 is a semi-schematic, semi-block diagram of one embodiment of the sonic identification system of the present invention.
Figure 4:
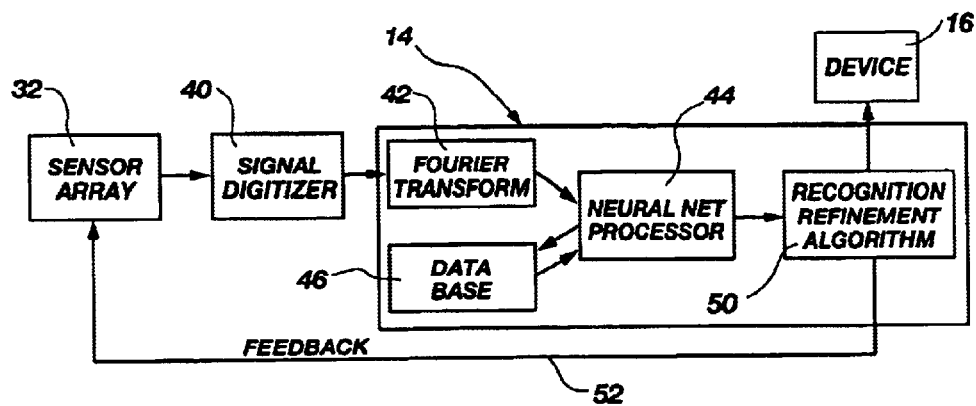
FIG. 4 is a block diagram of one embodiment of the sonic identification system of the present invention.

FIGS. 3 and 4 depict the functional elements of the sonic identification system. While the following description will refer to the physical embodiment shown in FIG. 2, the same functional elements are included in the embodiment of FIG. 1. In order to process the signals detected by the receivers, the detected ultrasonic waves must first be transformed into digital signals in order to be processed by the microprocessor 14. Accordingly, the sonic identification system includes a signal digitizer 40 for transforming the sound signals into digital form. The signal digitizer may physically be a part of the sensor/receiver array 32, or it may be an element of the microprocessor 14. In one embodiment, the signal digitizer is simply a PC sound card, configured to receive analog sound signals and convert them into digital form for manipulation by a personal computer. However, other more sophisticated signal digitizers may be applied to the invention.

The digitized sound signals are then analyzed by the microprocessor 14 using a fast Fourier transform algorithm 42, or FFT, to "tune" the reception (much as one would tune a radio station). Digitized signals can be analyzed to determine how much energy is present at different frequencies within a pre-determined range of frequencies by using an FFT algorithm. The FFT 42 pre-processes the sound signals received from the ultrasonic sensor in order to present a spectrographic data block to the neural network-based pattern-matching algorithm. This reduces the computational complexity for the pattern-matching algorithm (discussed below), allowing it to focus on distilled frequency data, rather than processing raw time-domain signals directly obtained from the ultrasonic sensor. The raw time-domain signals would contain a great deal of data that would not be meaningful to the neural network algorithm, but this meaningless data would still need to be processed just to eliminate it from the matching process. The FFT takes the raw time-domain ultrasonic data and converts it into a frequency domain.

These spectra are then analyzed using a neural net pattern recognition program 44. The neural net program works in conjunction with a database 46, which may use flash memory (48 in FIG. 3) in the microprocessor. This database contains records of spectra previously received and related to known subjects, preferably a large number of records. The neural network was previously trained on individuals that it has been shown before, and stores their spectrogram. The system includes a database manager to perform the functions of storing and retrieving records of previous spectrograms.

By repeatedly analyzing the incoming signals using the FFT 42 at a fixed time interval, a series of spectra are accumulated for a given subject. A data structure can then be established which contains an array of bins. Each bin contains a number representing the amplitude of reflected ultrasonic energy detected at a specific frequency at a specific instant in time. The entire array of bins represents a captured reflected spectrum, obtained at a single instant in time. Another data structure can be established which consists of an array of the first data structures. This second structure contains a series of spectrum snapshots, such that each snapshot represents the reflected ultrasonic spectrum at a specific instant in time. The full array of such snapshots is the record of a particular individual that is stored in the database 44, and represents the ultrasonic spectrum reflected by the target over a period of time (a sequence of instants).

The neural net program "learns" to recognize the subject 28 from which the sound waves were reflected. The sonar information of the picture is in a form such that it can be interpreted as spectrograms, frequency waveforms, power spectrograms, and other spectral formats. This information is examined by the computer using the neural network. Numerous techniques have been used in the past to achieve results with neural networks. One technique is back-propagation (roughly analogous to a feedback circuit in an electrical system), wherein examples of input features and the appropriate output are presented to the neural network. The neural network adjusts its own parameters to better fit and correctly classify the examples presented. Upon learning to classify the set of training examples, the neural network is then used to classify novel examples that it has not been trained upon previously (i.e. generalization).

By using back-propagation, such effects as aging, variations in subject movement, and positional variations are easily handled. In fact, the fast Fourier transform and the neural network tune out irrelevant features by varying frequency and power scans, turning specific receivers and transmitters on or off, and changing phase relationships of the emitted waves to allow a non-motional scan of an area observed. The faster learning and the updating of previously used driver information is also accomplished to insure "on-the-fly" training of the system.

The neural net identification system advantageously applies a time-averaging system. Information on previous scans of the subject 28 is written into the database 46 in an encrypted format. In one embodiment, the spectrogram stored in memory for a given subject is actually written over the previous spectrogram record in the database. The neural network is essentially mapping and comparing sonar frequency curves, spectograms, power spectrum, frequency distribution and correlating them with previously detected sonar information. This information is recalled and compared by a spectrogram matching/neural network facial analysis program to a current scan. In one embodiment, after the match is made, a copy of the most recent sound "picture" is written to memory in place of the previous one. In another alterative, data from the new sound image is combined with at least some of the date of the old image in order to produce an updated composite image. In yet another embodiment, the most recent picture can be saved along with at least one older image so as to create a series of images of the same subject. This technique ensures that aging, old images, and other changes to the original are updated out or at least compensated for. The images are stored in an encrypted format to prevent false use.

The computer system begins with a training set of examples, and a generalized set of ultra-sonic sound images. In one example, the training set may be ultra-sonic sound "images" of allowable drivers of a given car, and the generalized set of ultra-sonic sound images would be all sound images in the database. The ultra-sonic images, both the generalized set and the training set, preferably include images of the subjects in a variety of conditions—e.g. with or without their glasses, wearing different clothes, or in some other manner different than the original set of images. The neural network software digitally analyzes these images to determine invariant features that are associated with each record. Then when a new image is presented, the system immediately recognizes the invariant features of the new image and identifies it, or at least determines a likelihood of correlation of the new image with one of the records in the database.

It should be noted that this is not a "best fit" technique. A "best fit" system can indicate a match when a subject comes far closer to correlation with one record than to any other, even though the actual correlation may be quite low. For example, a "best fit" system that includes a record of only one bearded man may erroneously declare a match for any bearded man that is detected. The neural net system of the present invention, in contrast, is programmed to determine a correlation threshold. If the likelihood of correlation of the new image with any of the images in the database is below a certain threshold, the subject will not be recognized. In the case of a vehicle security switch, for example, if a valid driver is not recognized, the car simply will not start, even if the subject comes far closer to correlation with one record than to any other. This sort of system gives excellent results. Scaling (i.e. transferring recognition from a particular individual with glasses to the same individual without glasses) is easily handled, problems of system noise and irrelevant aspects of the training set (the legitimate drivers) are minimized and finally eliminated by the network iterations.

The output from the neural net pattern matching system 46 is continually fed to a recognition refinement algorithm 50 that is used to provide feedback (represented by line 52) and control the emitter and receiver array 32 to continually tune the system. The recognition refinement algorithm controls on/off, frequency transmitted/received, the spatial orientation (using the multi-layer frequency beam capabilities), the wavelength, and the scanning range (from about 45 KHz to 100+ KHz) of the emitter/receiver array. This effort assures maximum clarity and minimal noise in the optimized received sound "picture." This picture is fed to the neural network for the twofold purposes of (1) continuing sensor optimization and (2) continuing subject recognition. The system microcomputer, memory neural network software, sensors (transmitters and receivers) is unique in the adaptive facial recognition capability which optimize the sensor and the neural network output, thereby unambiguously identifying the individual, tuning the sensor, and storing his or her best "picture."

Advantageously, this is a completely passive system. No sensors are attached to the subject 28 being identified. The microprocessor 14 has complete control of all inputs, outputs, power/frequency spectrum, wavelength, and orientation of the miniature sensor array 32. Time-averaging and statistical techniques are also used by the neural network to insure optimal reception, transmission, and identification.

The invention is useful for security detection systems, safety detection systems, access and entry control, consumer feedback systems, and other systems requiring passive identification of persons. For example, referring to FIG. 6, the system may be used for positive identification of the operator of an automobile 100, to prevent car theft. A sonic sensor array 102 may be placed near the driver's seat of the automobile, and configured to emit ultrasonic waves toward the person 104 seated therein. The reflected ultrasonic picture is processed by a security algorithm to identify the would-be driver, and signal an engine disabler 106 or other device if the person is not recognized as being an authorized driver. The system can be programmed to allow only certain identified individuals to start the vehicle. The engine disabler or other device prevents the vehicle from being started or driven.

Figure 6:
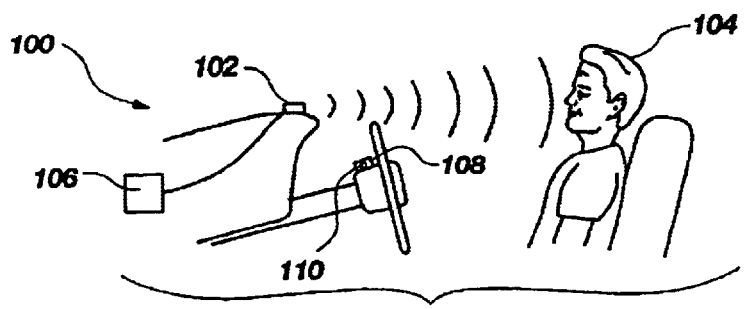
FIG. 6 is a pictorial view of two embodiments of the present invention installed as a security system in an automobile.

As shown in FIG. 6, a sensor device 102 may be placed on the dashboard of the vehicle. Alternatively, a sensor device 108 could be placed on the steering column of the vehicle. Additionally, a fingerprint sensor 110 (or other biometric sensor) could be incorporated into the sensor device, or placed near it, to work in conjunction with the sonic sensor array. A variety of biometric sensors, including fingerprint sensors, are widely commercially available. With this embodiment, in order to start the vehicle, the user must place his/her finger over the fingerprint sensor while turning the ignition key. The sensor array will sense the identity of the person and match the identity with the fingerprint in order to allow the vehicle to be started.

It will also be apparent that, at times, the vehicle security system depicted in FIG. 6 must be disabled to allow other persons, such as a valet or mechanic, to drive the vehicle. This can be accommodated in various ways. One method for disengaging the identity system is to have the approved operator hold his/her finger over the fingerprint sensor 110 while turning the engine off. This disengages the identification system and allows any other person to drive the vehicle. However, the system can be programmed to allow only limited driving by another person. For example, the system could limit the allowable number of start-ups of the engine. Alternatively, the system could limit the distance the vehicle could be driven from the place where the system was disabled, such as by interconnection with a GPS transceiver (not shown).

The level of detail possible from this vehicular system allows it to be employed in other ways as well. For example, the system can be used as a safety device for recognizing intoxication or drowsiness of a driver. Using the "learning" capabilities of the neural net algorithm, the system can be "trained" to recognize the signs of drowsiness or intoxication, such as drooping eyes and/or certain head movements that indicate some type of impairment. The system can then disable the vehicle 100 or cause some other result according to a preprogrammed safety algorithm.

Figure 5:
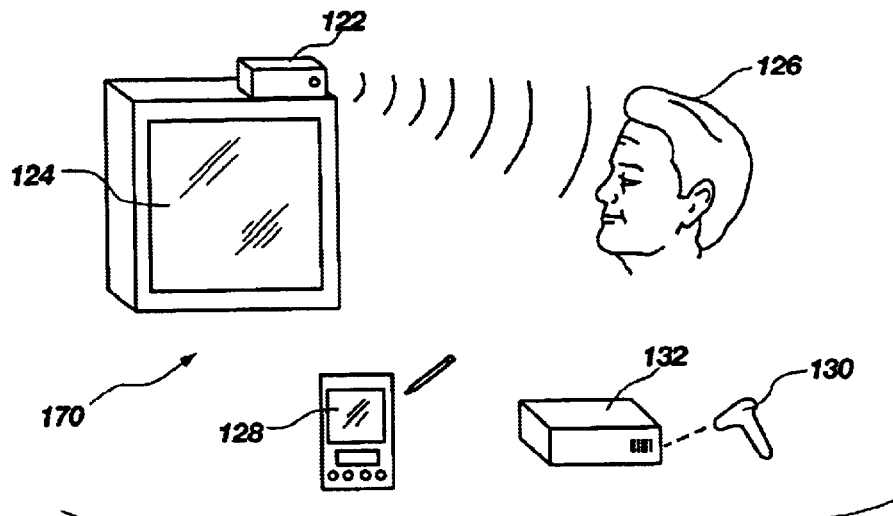
FIG. 5 is a pictorial view of a television viewer detection and consumer feedback system in accordance with the present invention.

Another example of a useful application of the present invention is for a television rating feedback and/or market research system 120, shown in FIG. 5, also referred to as the TeleVote system. This system uses a combined emitter/sensor/microprocessor device 122 associated with a television 124 to accurately monitor viewership and specific characteristics of a viewer 126 of television programs and/or advertising. Because the system uses sound to recognize individuals, the system is fully functional in a semi-darkened television viewing area. The system examines, correlates, and ties the reflected information to previously trained-upon faces and other data that has previously been input to the computer system. As noted above, the sonar echoes detected by the system return not just surface information about the viewers, but a far richer content, including body weight effects, chest cavity sonar effects, and more information than normal visual light can convey. For example, the sensor array can detect not only the identity of the viewers who are watching at a given moment, but can also detect whether the viewers are looking at the television screen or have their eyes wandering, to gauge their interest.

This television system 120 can be used for determining television ratings, or for market research. For example, as part of a television rating system, the emitter/sensor/microprocessor device 122, interconnected with the television 124, can passively detect the identities of people watching a particular program, and even detect their apparent level of attention. It can also do the same with particular television advertisements. The system can also be configured to take active input from viewers, such as by using a small handheld input device 128 (e.g. like a PDA) to allow viewers to directly provide opinions on particular programs or advertisements.

The television system 120 can also be configured to provide more extensive consumer feedback using a product input device, such as a bar code scanner 130 to scan products 132 that the consumers actually purchase. By scanning purchased products, the system can correlate purchases with advertisements known to have been viewed by the person. The knowledge of what advertisements the viewers have seen coupled with knowledge of what products they actually buy would provide invaluable market feedback on the effectiveness of advertising. The system can use the normal electrical wiring in the home to transfer viewer identification and consumer preferences through the telephone system, for example.

Figure 7:
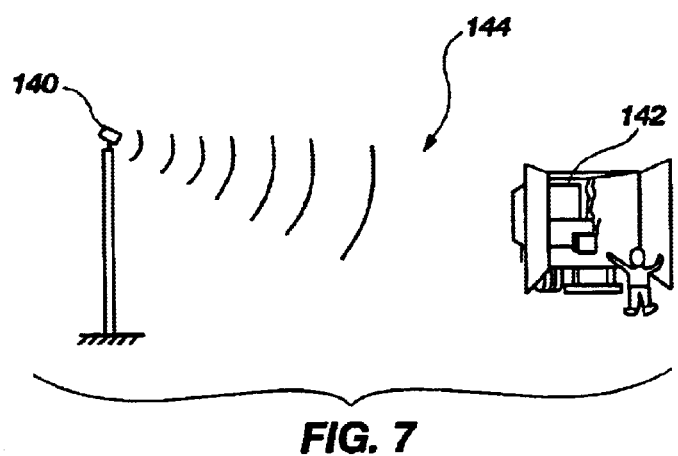
FIG. 7 is a perspective view of a system for detecting theft, vandalism, or other conditions around a cargo trailer.

Another application of the invention, depicted in FIG. 7 is for security, wherein the system is used to detect the activities of people in certain areas. The time-averaging system of the invention has the capacity to make assessments regarding the nature of activity of a person or object in a target area. For example, the system can passively detect theft, vandalism, etc., without the need for a human security guard. A detector array 140 can be aimed at tractor-trailers 142 or other storage containers, such as cargo containers (not shown), or railcars (not shown), within a storage area 144 to detect if these are opened or harmed. The system can sound an alarm or provide other desired feedback when such conditions are detected.

A similar application could be used in hospitals, nursing homes, prisons, and other such places, for electronically monitoring the condition of inmates. For example, the system could be trained to detect whether a hospital patient is asleep, restless, or likely experiencing pain, and automatically provide this information to a health care provider. Many other such applications are also possible.

Figure 8:
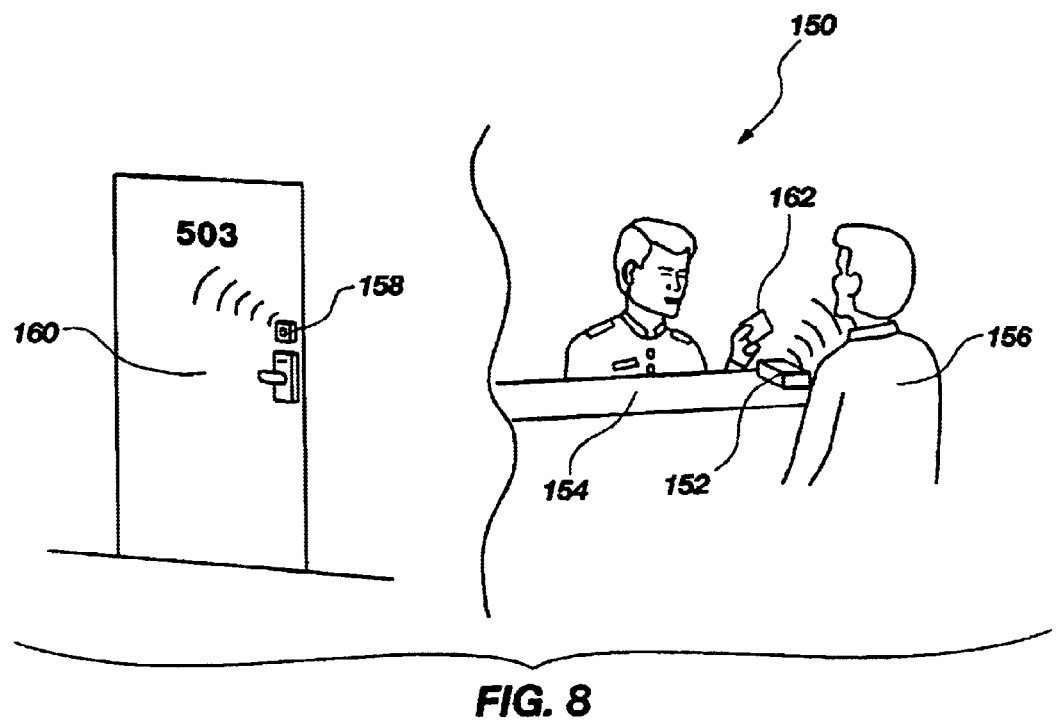
FIG. 8 illustrates the use of another embodiment of the present invention as a security and safety system for hotels.

Another embodiment of the invention can be used as a hotel security and safety system 150, as illustrated in FIG. 8. Such a system might use an identification array 152 at the hotel reception desk 154 to obtain an initial picture of the person(s) 156 renting a room. Then, a sonic emitter/receiver device 158 on the door 160 of each hotel room would prevent any unauthorized persons from entering, even if they had a key (e.g. a card key 162) for the door. Such a system could also be used for home security.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A sonic identification system, comprising:
   a) an emitter, configured to broadcast ultra-sonic energy toward a subject at a variety of frequencies within a frequency range during a time interval;
   b) a receiver, configured to receive and detect the ultra-sonic energy reflected off of the subject, and to develop signals representing characteristics of the reflected ultra-sonic energy; and
   c) a microprocessor, coupled to at least one of the emitter and receiver, including:
      i) a pre-processor, configured to receive the signals from the receiver and to develop a new spectrogram of the subject comprising a plurality of said signals taken over the time interval;
      ii) a memory, configured for containing records of spectrograms related to a plurality of known subjects; and
      iii) a processor configured to analyze the new spectrogram using a pattern-matching algorithm, to identify invariant features of the new spectrogram, and to determine whether the identity of the subject of the new spectrogram is the same as the subject of any of the records of spectrograms stored in the memory.

2. A system in accordance with claim 1, wherein the frequency range includes frequencies that penetrate soft tissue, and frequencies that reflect off of soft tissue of a human subject.

3. A system in accordance with claim 1, wherein the frequency range is from about 45 kHz to about 100 kHz.

4. A system in accordance with claim 1, wherein the emitter is configured to continuously vary the frequency across the frequency range during the time interval.

5. A system in accordance with claim 1, wherein the emitter is configured to emit ultra-sonic energy at a variety of power levels during the time interval.

6. A system in accordance with claim 5, wherein the variety of power levels are within a range of from about 0.25 watts to about 2.5 watts.

7. A system in accordance with claim 1, wherein the emitter is a piezo-electric transducer.

8. A system in accordance with claim 1, wherein the emitter and receiver comprise an array of emitters and receivers disposed upon a common support structure.

9. A system in accordance with claim 8, wherein the common support structure comprises a back plate and a front plate, and the directional orientation of the array can be changed by varying the wavelength and frequency of signals transmitted to emitters on the back plate and front plate relative to each other, without physically moving the array.

10. A system in accordance with claim 9, wherein the microprocessor is configured to process the received signals using a Fourier transform algorithm, and to tune the sensor array based upon a recognition refinement algorithm by selectively controlling (a) an on/off condition of each of the emitters and receivers in the array; (b) the frequency and wavelength of ultra-sonic energy broadcast by the emitters; and (c) the directional orientation of the array, so as to increase clarity and reduce noise in the signals developed by the receivers.

11. A system in accordance with claim 1, wherein the microprocessor is configured to compare the new spectrogram to the spectrographic information related to the other subjects using a neural net pattern recognition algorithm, so as to determine a likelihood of correlation of the new spectrogram to the other spectrograms, and thereby allow identification of the subject as being identical to the subject of another spectrogram if the likelihood of correlation is above a selected threshold level.

12. A system in accordance with claim 11, wherein the microprocessor is configured to:
   a) update its memory by overwriting the previously-stored spectrogram related to the subject with the new spectrogram upon identification of the new spectrogram as being identical to another spectrogram, so as to increase the likelihood of future identification of the subject; and
   b) store the new spectrogram separately in memory if unable to identify the new spectrogram as being identical to another spectrogram above the threshold level.

13. A system in accordance with claim 1, wherein the microprocessor is configured to continuously develop a plurality of spectrograms over the time interval, and to store the plurality of spectrograms in memory, so as to retain spectrographic information related to the subject in a variety of conditions.

14. A system in accordance with claim 13, wherein the variety of conditions include varying spatial orientations of the subject, and varying physical features.

15. A system in accordance with claim 1, wherein the receiver is configured to develop time-domain signals representing the characteristics of the reflected ultra-sonic energy, and the pre-processor is configured to convert the time-domain signals to frequency domain signals for creating the new spectrogram.

16. A sonic identification system, comprising:
   a) an array of ultra-sonic emitters and receivers, the emitters being configured to broadcast ultra-sonic energy toward a subject at a variety of frequencies within a frequency range over a time interval, and the receivers being configured to receive and detect ultra-sonic energy reflected off of the subject, and to develop signals representing characteristics of the reflected ultra-sonic energy; and
   b) a microprocessor, having a memory, configured to:
      i) receive the signals from the receiver;
      ii) develop a new spectrogram of signals reflected from the subject over the time interval;
      iii) compare the new spectrogram of the subject with other spectrographic information stored in memory, using a neural net pattern recognition algorithm, so as to determine a likelihood of correlation of the new spectrogram with the other spectrographic information;
      iv) identify the subject as being identical to the subject of another spectrogram if the likelihood of correlation is above a selected threshold level; and
      v) update the spectrographic information stored in memory by replacing the previously-stored spectrographic information related to the subject with the new spectrogram, thereby increasing the likelihood of future identification of the subject.

17. A method of identifying characteristics of a subject, comprising the steps of:
   a. exposing a first subject to ultra-sonic energy at a variety of frequencies within a frequency range over a time interval;
   b. receiving and detecting reflections of the ultra-sonic energy from the first subject;
   c. producing a spectrogram representing the reflections over the time interval using a microprocessor having a memory containing a plurality of prior records of spectrographic information, each of the plurality of prior records being related to a specific subject;
   d. comparing the spectrogram of the first subject to each of the records of spectrographic information contained in the memory using a pattern recognition algorithm, so as to determine a likelihood of correlation of the first spectrogram to any of the plurality of prior records;
   e. identifying the first subject as being identical to the subject related to a prior record if the likelihood of correlation is above a selected threshold level; and
   f. storing the spectrogram related to the first subject in memory for future comparison with other spectrograms.

18. A method in accordance with claim 17, further comprising the steps of:
   g) repeating steps a–d for a second subject;
   h) comparing the spectrogram of the second subject to the spectrogram of the first subject using a pattern recognition algorithm, so as to determine a likelihood of correlation of the first spectrogram to the second spectrogram; and
   i) identifying the second subject as being the first subject if the likelihood of correlation is above a selected threshold level.

19. A method in accordance with claim 17, wherein the step of producing the spectrogram comprises the more specific step of analyzing the reflections using a Fourier transform algorithm.

20. A method in accordance with claim 17, wherein the step of storing the spectrogram in the memory comprises replacing the previously-stored prior record related to the first subject with a new record related to the first subject, the new record comprising the spectrogram, such that the microprocessor retains in memory the most current spectrographic information related to the first subject.

21. A method in accordance with claim 17, wherein the step of storing the spectrogram in the memory comprises creating a new record of spectrographic information that combines at least a portion of the previously-stored prior record related to the first subject with at least a portion of the spectrogram, such that the microprocessor retains in memory a broad profile of spectrographic information related to the first subject.

22. A method in accordance with claim 17, wherein subject is a person.

23. A method in accordance with claim 22, wherein the characteristics of the subject are selected from the group consisting of the person's facial appearance, the orientation of the person's physical body, and the person's actions.

24. A method for a user to actuate a device, comprising the steps of:
   a. exposing the user to ultra-sonic energy at a variety of frequencies within a frequency range over a time interval;

b. receiving and detecting reflections of the ultra-sonic energy from the user;

c. producing a new spectrogram representing the reflections over the time interval using a microprocessor having a memory containing a plurality of prior records of spectrographic information, each of the plurality of prior records being related to an authorized user of the device;

d. comparing the spectrogram of the user to each of the prior records of spectrographic information contained in the memory using a pattern recognition algorithm, so as to determine a likelihood of correlation of the new spectrogram to any of the plurality of prior records;

e. identifying the first subject as being an authorized user of the device if the likelihood of correlation is above a selected threshold level;

f. storing the new spectrogram in memory for future comparison with other spectrograms; and g. actuating the device.

25. A method in accordance with claim 24, wherein the device is selected from the group consisting of an access lock, and a transport vehicle.

26. A method in accordance with claim 25, wherein the access lock is selected from the group consisting of a door lock, a padlock, and a safe lock.

27. A method in accordance with claim 25, wherein the transport vehicle is selected from the group consisting of an automobile, a truck, a motorcycle, an airplane, and a boat.

28. A method in accordance with claim 24, wherein the step of storing the spectrogram in the memory comprises replacing the previously-stored prior record related to the user with a new record related to the user, the new record comprising the new spectrogram, such that the microprocessor retains in memory the most current spectrographic information related to the user.

29. A method in accordance with claim 24, wherein the step of storing the spectrogram in the memory comprises creating a new record of spectrographic information that combines at least a portion of the previously-stored prior record related to the user with at least a portion of the new spectrogram, such that the microprocessor retains in memory a broad profile of spectrographic information related to the user.

* * * * *